Patented Aug. 7, 1945

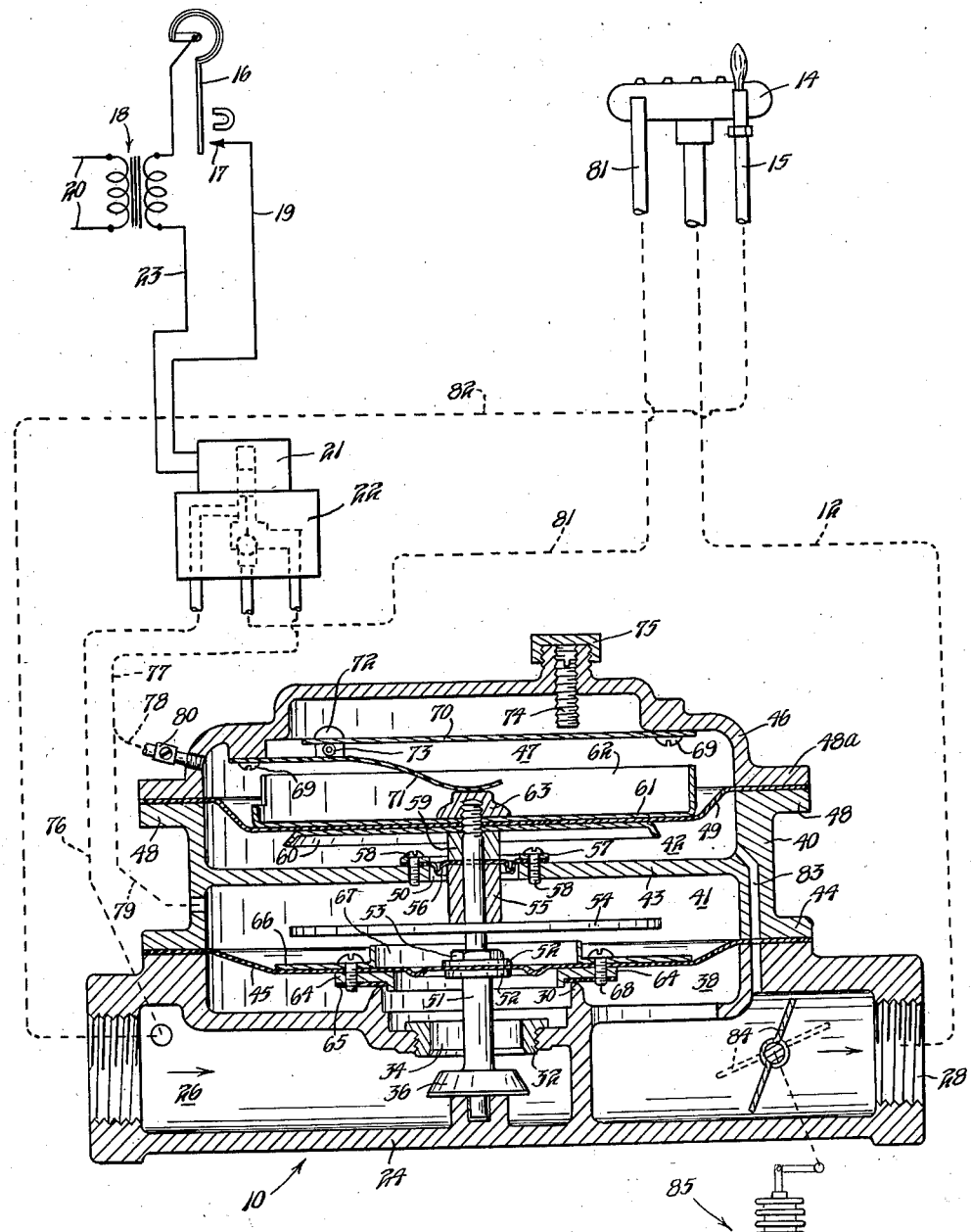

2,381,799

UNITED STATES PATENT OFFICE 2,381,799

DIAPHRAGM VALVE

George H. Berkholder, Minneapolis, Minn., assignor to Minneapolis-Honeywell Regulator Company, Minneapolis, Minn., a corporation of Delaware Application September 20, 1943, Serial No. 503,051

18 Claims. (Cl. 137—144)

This invention relates to an improved diaphragm valve and more particularly with a step opening, pressure control, diaphragm valve.

One of the principal objects of the present invention is to provide a compact step-opening valve having a relatively few working parts which will consistently and uniformly function to quickly produce a minimum flow, then to gradually increase the flow to a predetermined volume and thereafter to accurately control the flow. Means are also provided for controlling the flow in relation to the pressure in the outlet portion of the device balanced against the tension of an adjustable control spring, or other control means.

Another object of importance and advantage of the present invention resides in the provision of means for employing two diaphragms to operate sequentially on a single valve stem and valve to produce a two step valve opening action, wherein the initial step is relatively quick and the second step is gradual and slow.

A further object of importance and advantage resides in the provision of means for operably associating an annular valve member with the valve stem to permit independent movement of said valve member in relation to the stem during the initial opening step of the valve, and movement in unison of the said valve member and said stem member during the second step of the valve opening movement.

Still another object of advantage and importance is the provision of means for providing positive stop means limiting the opening step movement of the valve and lower diaphragm and then conforming further opening movement of the valve to the retarded movement of the upper diaphragm. Adjustable tension means in cooperation with adjustable pressure control means are also provided for retarding the upward movement of the valve and diaphragm.

A still further object of advantage is the provision of means for operably associating two diaphragms with the stem so that the lower diaphragm and valve may move upwardly for a limited distance, or downwardly to valve seating position, independently of the upper diaphragm and stem, but all upward movement above the limited distance must be in unison with the stem and upper diaphragm.

Still another object of advantage and importance resides in the provision of means for employing an adjustable control spring for assisting in maintaining the valve stem in closed position as the valve is opened to minimum flow position.

An additional object of importance is the provision of means for yieldably resisting all upward movement of the valve stem and assisting all downward movements thereof through an adjustable control spring.

A further object of importance and advantage resides in the provision of means for adjusting the bleed associated with the upper diaphragm to produce a slow, gradual movement of the diaphragm and other parts operable therewith. Means are also provided for curtailing the flow of fluid through the device when excessive pressure raises either or both diaphragms above a predetermined position.

An additional object of advantage and importance of the improved device of this invention resides in the provision of means for employing governor means functioning in response to a condition responsive element for bringing a regulator valve into action thus curtailing the flow of fluid through the device.

A further object of advantage and importance resides in the provision of means for controlling the flow of fluid through the device in reversed relation to the pressure built up within the system on the outlet side of the main valve.

Additional objects of advantage and importance will become apparent as the following detailed description progresses, reference being had to the accompanying drawing, wherein the figure is a schematic arrangement of a control system, showing a diaphragm valve in section, which embodies the invention.

The illustrated embodiment of the invention shown in the single figure of the drawing positions the flow control valve 10 of this invention in a fuel supply line 12 which terminates in a burner 14. The valve 10 may be controlled by an electrically operated thermostat 16 which derives its energy from a transformer 18 which in turn is supplied by a power line 20. The thermostat 16 functions to operate a relay actuated pilot valve 22 which in turn controls the operation of the flow control valve 10.

The flow control valve 10 comprises a valve housing 24 having an inlet 26 and an outlet 28 with an annular valve seat 30 interposed therebetween. The annular valve seat 30 is recessed and internally threaded to receive a male threaded ring shaped insert 32. The lower internal edge of the insert is preferably chamfered to provide a tapered seat 34 for a control valve 36. The upper portion of the housing 24 is recessed to form a pressure chamber 38.

Positioned on the valve housing 24 and secured in place by suitable means is a diaphragm housing member 40. The housing member 40 is preferably circular in plan, as is indicated by the shading of the drawing, and is recessed to provide pressure chambers 41 and 42 with a wall 43 therebetween. Interposed between a flange 44 of the housing member 40 and the valve housing 24 is a diaphragm 45.

Positioned on the housing 40 and secured in place by any suitable means is a diaphragm cover member 46. The cover member 46 is recessed to provide a pressure chamber 47. Interposed between flanges 48 and 48a of the housing member 40 and the cover 46 is a diaphragm 49.

Fixed to the control valve 36 and projecting upwardly through the insert 32 and penetrating the diaphragm 45 and thence extending through an aperture 50 in the wall 43 and penetrating the upper diaphragm 49 is a valve stem 51. The diaphragm 45 is preferably secured to the valve stem 51 by means of washers 52 and a securing nut 53. Secured to the valve stem 51 in spaced relation and substantially parallel with the diaphragm 45 is a disc 54. Positioned on the valve stem 51 and having its lower end in engagement with the disc 54 and its upper end terminating in the aperture 50 is a spacing member 55. Positioned on the upper end of the spacing member 55 and having its edge overlying the aperture 50 in the wall 43 is a circular sealing diaphragm 56. The sealing diaphragm may be secured in fluid-tight association with the wall 43 by means of a ring 57 and a plurality of securing screws 58. The sealing diaphragm is sufficiently slack to permit free longitudinal movement of the valve stem 51.

Positioned on the valve stem 51 and having its lower end resting upon the sealing diaphragm is a spacing element 59. Secured against the lower and upper surfaces of the diaphragm 49 are reinforcing members 60 and 61, respectively. The upper reinforcing member 61 is preferably dished, as is shown in the drawing, and the upwardly projecting flange 62 thereof provides a stop limiting upward movement of the part. The reinforcing members 60 and 61 together with the spacing members 55 and 59 are maintained in operable position by engagement of a screw threaded securing nut 63 with the screw threaded end of the valve stem 51.

An annulus 64 disposed against the lower surface of the lower diaphragm 45 is provided with a washer 65. The annulus, washer and diaphragm coact with the valve seat 30 to provide a fluid-tight valve. Positioned on the upper surface of the lower diaphragm 45 is an apertured reinforcing member 66. A portion of the reinforcing member adjacent the aperture is turned at right angles to form a circular flange 67 which upon upward movement of the valve is engageable with the disk 54. The annulus 64 and the reinforcing member 66 are preferably secured to the diaphragm 45 and to each other by a plurality of screws 68.

Horizontally positioned within the upper chamber 47 and secured to radially opposed portions of the cover 46 by means of screws 69 is a pair of leaf spring members 70 and 71. Spring member 70 which is preferably flat is positioned with its free end overlapping the free end of the spring member 71 as is clearly shown in the drawing. The free end of the spring member 71 is curved downwardly to engage the securing nut 63. Projecting upwardly from opposed sides of the spring member 71 intermediate the ends thereof is a pair of guide and securing bosses 72. One boss only is shown in the sectional view of the device. Operably disposed between the bosses 72 and in engagement with the under surface of the spring member 70 is an antifriction roller 73. The bosses 72 in addition to supporting the roller 73 also function as guides to maintain the spring member 70 in alignment with the roller 73. An adjustment screw 74 screw threadedly associated with the cover 46 and in alignment with the spring member provides a means for adjusting the tension of the leaf spring members against the nut 63. Accordingly resistance to upward movement and assistance to downward movement of the stem and associated parts may be varied. Additionally the adjustment screw may be utilized in conjunction with the reinforcing members, spacers, and disk, which function as counterweights, to assist in biasing the valve to closed position. A cap 75 disposed on the cover 46 protects the adjustment screw from accidental movement and also insures against leakage from the chamber 47 through the adjustment means.

Extending from the inlet 26 to the pilot valve 22 is a tube 76 by means of which fluid under pressure may be delivered to the pilot valve. Operably connected with the pilot valve 22 is a tube 77 which terminates in a branch 78 extending into the upper chamber 47 and a branch 79 extending into the lower chamber 41. The branch 78 is provided with an adjustable restriction 80 for controlling the rate of flow therethrough. Extending from the pilot valve 22 to a point near the burner 14 is a waste tube 81. The waste tube 81 is adapted to convey bleed or waste fluid from the pilot valve 22 to the burner 14 where it may be consumed.

Extending from a point in the supply line ahead of the main valve is a pilot supply tube 82. The tube 82 is adapted to deliver a constant supply of fluid to the pilot burner 15.

Connecting the outlet 28 with the chamber 42 is a passage 83. The passage 83 provides a means for conveying fluid to and from the chamber 42. Thus the pressure within the chamber is substantially equal to the pressure within the outlet 28.

Operably positioned within the outlet on the downstream side of the passage 83 is a flow control governor 84. The flow control governor 84 is adapted to be operated by a condition responsive device 85 or the like. The governor is adapted to operate between a full flow and a minimum flow range and by its action vary pressure within the outlet sufficiently to activate, through pressure on the diaphragms, the control valve 36 and the main valve.

It will be apparent that after a minimum flow has been established the reinforcing member 63 engages and is secured against the disk 54 by reason of the pressure on the underside of the diaphragm 45 which is opposed by the force exerted by the control springs on the stem 51 through the nut 63. Consequently, all further normal opening or control movements responsive to flow or pressure conditions are carried out by movements of the associated elements as a unit. The adjustable restriction 80 and the relatively small passage 83 function as brakes preventing rapid control movement of the unit.

Accordingly fluttering, or other undesirable movement, of the control or shut-off valves, not responsive to control requirements, is eliminated.

*Operation*

The device as shown in the drawing is in closed position. The pilot light 15 is burning and the thermostat 16 is in satisfied or open position. Upon a call for heat the free end of the thermostat 16 moves into engagement with the contact 17 thus closing a circuit from the transformer 18 through the thermostat 16, the lead wire 19, to the relay 21, which is energized, thence returning through the lead wire 23 to the transformer 18. The energization of the relay 21 opens the pilot valve 22 to permit bleeding of the pressure chambers 41 and 47 through the tubes 79, 78, 77 and 81. The waste gas is conveyed through the tube 81 to the burner 14 where it is consumed. As the pressure in the chamber 41 decreases, the pressure in the inlet 26 contacting the central portion of the under surfaces of the diaphragm 45 and the annulus 64 snap them upwardly until the circular flange 67 of the reinforcing member 66 contacts the under surface of the disc 54. It is to be noted that sufficient slack is provided in the central portions of the diaphragms 45 and 56 to permit the minimum opening of the valve without disturbing or moving the valve stem 51. At this point a minimum flow has been established and the limited flow of fluid passing through the supply line 12 is readily ignited by the pilot light as it leaves the burner 14. Concurrently, with this action the chamber 47 is slowly bled through the restricted tube 78 and the tubes 77 and 81 and at the same time pressure is built up within the chamber 42 by means of the flow of fluid from the outlet 28 through the passage 83. As the pressure in the chambers 38 and 42 builds up it reaches a point where it overcomes the diminishing pressure in the chamber 47 and the resistance of the springs 70 and 71 and thus forces the diaphragms 45 and 49, the valve stem 51, and other parts associated therewith and forming the movable unit, slowly upwardly until a permitted maximum flow has been established. The flow of fluid through the device is controlled and maintained at a desired rate by means of control valve 36 which is operated in relation to pressure on the underside of the diaphragms 45 and 49 and the force exerted on the upper end of the valve stem 51 by the control springs 70 and 71. Thus, if the pressure within the chambers 38 and 42 builds up the increased pressure acting upon the undersides of the diaphragms exerts an upward urge overcoming the spring members 70 and 71 and moving the control valve 36 toward engagement with the insert 34 thereby decreasing the flow of fluid. If the pressure in the chambers drops, the control springs 70 and 71 overpower the reduced pressure under the diaphragms and force the valve stem 51 downwardly thus increasing the distance between the control valve 36 and the insert 34 permitting the flow to increase. In this event the control valve 36 functions alone to control the flow of fluid through the device.

The flow control governor 84 is activated by a condition responsive element 85, or limit control, or the like, to govern the flow between a predetermined minimum and a predetermined maximum.

Assume for instance that the condition responsive element 85 calls for a decerase in flow while the thermostat is in unsatisfied position as where the temperature in the heating plant reaches its upper limit. The call is reflected in movement of the flow control governor 84 toward minimum flow position. With the outlet passage 28 obstructed flow is decreased by the obstructing member. Concurrently, with the reduction of flow, pressure within the chambers 38 and 42 increases raising the diaphragms and attached stem 51 which movement operates the control valve 36 toward closed position. In this event both governor 84 and control valve 36 function to reduce the flow. It is to be noted that the speed of operation and the rate of flow may also be varied as desired by proper setting of the adjustment members 74 and 80.

Upon the thermostat 16 becoming satisfied the contact at 17 is opened and the relay 21 is de-energized. The pilot valve 22 in response to the relay action closes a waste valve and opens a supply valve in the pilot valve 22 thus permitting fluid to pass from the supply line through the tubes 76, 77, 78 and 79 into the chambers 41 and 47. The flow of fluid into the chamber 41 is relatively fast, consequently the diaphragm 45, the annulus 64, and the washer 65 are quickly forced into closed position while the valve stem 51 and upper diaphragm 49 are still in open position. However, the flow of fluid through the supply line 12 has been quickly terminated by the downward movement of the single diaphragm. The diverted control fluid continues to flow through the tube 78 into the chamber 47 and with the assistance of the springs 70 and 71 forces the stem 51 and the diaphragm 49 into closed position. The pressure in the chambers 41 and 47 is now substantially equal to the pressure in the inlet 26 and the cycle of operation is completed.

It is to be noted that the control springs 70 and 71 and the weight of the spacers and other members associated with the annulus and valve stem combine to maintain the valve in closed position even if the fluid pressure on the surfaces of the diaphragms is cut off. Thus a failure in the supply line would result in the prompt closing of the valve. Additionally, in the event the stem or control valve does not move into proper position for closing the valve, because of sticking or the like, the slack in the diaphragm permits the annulus and washer to move into engagement with the valve seat thus completely closing the passage between the inlet and the outlet.

It will be apparent from the foregoing that herein is provided a highly efficient and dependable flow control device comprising a relatively few parts and which opens and closes a shut-off valve by operation of a single diaphragm and controls the flow of fluid through the open device by the combined and unified operation of two coacting diaphragms.

It will also be apparent to those skilled in the art to which the improved device of this invention appertains that numerous changes in construction and design may be made without departing from the spirit or scope of the invention. Accordingly, the patent granted hereon is not to be limited to the precise embodiment here disclosed or in any other manner except as may be necessitated by the prior art and the terminology of the appended claims when given the range of equivalents to which they may be entitled.

I claim as my invention:

1. In a flow control device, a valve, means for opening said valve in a plurality of steps, said means including a diaphragm operably connected with said valve, a stop, said diaphragm being operable to move said valve through its initial opening into engagement with said stop, means for moving said valve and said stop through a further opening step, a control valve, and actuating means rigidly attached to said control valve and movable concurrently therewith in opening and closing directions, said control valve and said actuating means being movable relative to said first named valve and opening means.

2. In a flow control device, a step opening valve, a stop, means for moving said valve into engagement with said stop to establish a minimum flow, means for moving said stop to permit further opening of said valve, means for selectively controlling the rate of movement of said stop, and means for utilizing outlet pressure to operate said first and said second named means for controlling the flow to maintain a predetermined outlet pressure.

3. In a flow control device, a main valve, a pair of diaphragms, means connecting said diaphragms to said valve in spaced apart relation one above the other, one of said diaphragms and said valve being movable at a rapid rate for a limited distance independently of said means and the other of said diaphragms, and means including both diaphragms for moving said valve to full open position at a selected slower rate of speed.

4. In a flow control device, a main valve, a diaphragm, said valve being connected with said diaphragm, a stem connected with a second diaphragm in concentric relation with said valve and said first diaphragm, said diaphragms being spaced and having movable portions thereof fixed against relative movement, means for rapidly moving said valve and a portion of said first diaphragm independently of said stem, means directing outlet pressure against both diaphragms for moving said stem, said valve, and said diaphragms in unison, and means for selectively retarding such movement.

5. In a flow control device, a main valve, means for moving said valve from closed to open position in a plurality of steps, said means including a diaphragm, stop means for limiting the first step of said valve opening movement, and means including a second diaphragm for moving said stop means and said main valve in unison at a selected rate through another step in the valve opening movement, said diaphragms being disposed to be operated in unison by a common force during said last named opening step.

6. In a flow control device, a valve, stop means limiting the opening movement of said valve, pressure actuated means for moving said valve into engagement with said stop means, means for moving said stop means to permit further opening of said valve, and means for retarding movement of said stop in either direction responsive to said moving means requirements.

7. In a flow control device, a main valve, means for moving said valve from closed to open position in a plurality of steps, said means including a first and a second diaphragm, means for utilizing said first diaphragm only to complete the first step of said valve opening movement, means for employing said first and said second diaphragms in unitary movement for completing another step of said valve opening movement, and means for controlling the speed of said last named movement.

8. In a flow control device, a valve adapted to be opened in a plurality of steps, stop means interposed in the path of travel of said valve, pressure responsive means for first moving said valve into engagement with said stop means and then moving said stop means permitting further opening movement of said valve, means for retarding responsive movement of said stop relative to said pressure responsive means requirements, and means for selectively altering the speed of said steps relative to each other.

9. In a flow control device, a valve, means for opening said valve in a plurality of steps, said means including a pair of common pressure actuated members operably connected with said valve, one of said members being operable to rapidly move said valve through its initial opening step, stop means limiting said opening step, means including both members for moving said stop and said valve through a further opening step, and means preventing rapid movement of said stop in valve opening and closing directions.

10. In a flow control device, valve means for controlling the flow through said device, a pair of pressure actuated diaphragms connected to a common source of pressure and operably connected with said valve, bleed means associated with said diaphragms, means for moving one of said diaphragms and said valve in valve opening direction at a rapid rate for a limited distance, means for moving both of said diaphragms and said valve in unison in further valve opening direction at a substantially slower rate, means for utilizing both diaphragms to control flow through said device, and means for employing one diaphragm to move said valve means to stop the flow through said device.

11. In a flow control device, valve means for controlling a flow of fluid through said device, pressure actuated means for moving said valve means for a limited distance in opening direction at a rapid rate, pressure actuated means for moving said valve means in further valve opening direction at a substantially slower rate, said moving means being in communication with each other and a common source of pressure, means yieldably resisting said last named movement, said last named means opposing the pressure of the controlled fluid and together providing means for maintaining said moving means in spaced relation fixed against independent movement after said rapid opening movement, and means for closing said valve means.

12. In a flow control device, a valve, means for opening said valve to establish a minimum flow, a stop for limiting the opening movement of said valve, pressure responsive means for moving said stop to permit further opening of said valve, means for selectively differing the rate of one of the opening movements of said valve from the other, and means for applying a common force to operate said valve opening means and said pressure responsive means in unison to control flow through the device.

13. In a control device, a control valve having a stem, two pressure actuated diaphragms connected in spaced relation to said stem, a fast bleed and an adjustable slow bleed associated with said diaphragms, one side of each of said diaphragms being in communication with the outlet portion of said device, a shut off valve secured to one of said diaphragms, a stop member secured to said stem intermediate said diaphragms, said diaphragm and connected valve providing a unit movable independently of said stem and said other diaphragm for a limited distance, and an adjustable control spring resisting further opening movement of said shut off valve.

14. In a flow control device, valve means for controlling the flow through said device, means for moving said valve, a stop limiting the opening movement of said valve means, means for moving said stop to permit further opening movement of said valve means, and means for retarding flow of a common actuating pressure to said stop moving means to cause movement of said stop moving and said valve moving means in unison to maintain a predetermined outlet pressure.

15. In a flow control device, a first diaphragm, means for rapidly moving said diaphragm for a limited distance in a given direction, stop means preventing the further independent movement of said diaphragm in said given direction, a second diaphragm controlling said stop means, and means for retarding the movement of said second diaphragm, said diaphragms being connected to a common moving force.

16. In a flow control device, a first diaphragm, means for rapidly moving said diaphragm for a limited distance in a given direction, stop means preventing the further independent movement of said diaphragm in said given direction, a second diaphragm controlling movement of said stop means, said second diaphragm and said stop means being fixed against relative movement, means for moving said first and said second diaphragms further in said given direction in concert, and means for retarding the speed of said further movement.

17. In a flow control device, a stem a first diaphragm, means for rapidly moving said diaphragm for a limited distance in a given direction, stop means preventing the further independent movement of said diaphragm in said given direction, a second diaphragm controlling said stop means, said diaphragms being joined to said stem in spaced relation, means for moving said first and said second diaphragms further in said given direction in concert, and means for returning said first and said second diaphragms to their respective starting places independently and at different rates of speed.

18. In a control device, a valve structure comprising in combination, a stem having a shutoff valve and a control valve operably attached thereto in spaced apart relation, a pair of valve seats disposed in operable association with said valves, means operable on said stem biasing said control valve toward open position, a pair of diaphragms secured to said stem in spaced apart relation, a partition through which said stem extends separating said diaphragms, means communicating a common pressure to and from each of said diaphragms at different rates, a first of said diaphragms and said shut off valve being movable concurrently for a limited distance relative to said stem and said second diaphragm; said second diaphragm, said control valve, said biasing means and said stem being movable in concert independently of said first diaphragm, said diaphragms and said valves being disposed to move in unison throughout a portion of their operative travel, and means including said communicating means for selectively altering the rate of movement of said control valve and parts movable with said second diaphragm.

GEORGE H. BERKHOLDER.